United States Patent [19]

Parekh

[11] 4,118,437
[45] Oct. 3, 1978

[54] CROSS LINKABLE POWDER COATING COMPOSITIONS

[75] Inventor: Girish Girdhar Parekh, Stamford, Conn.

[73] Assignee: American Cyanamid Company, Stamford, Conn.

[21] Appl. No.: 674,797

[22] Filed: Apr. 8, 1976

[51] Int. Cl.² ............... C08L 63/00; C08L 61/24; C08L 61/20
[52] U.S. Cl. .................... 260/834; 260/840; 260/850; 260/851
[58] Field of Search ............... 260/834, 840, 850, 851

[56] References Cited

U.S. PATENT DOCUMENTS

| | | | |
|---|---|---|---|
| 2,719,831 | 10/1955 | Craemer | 260/841 |
| 2,719,832 | 10/1955 | Craemer | 260/847 |
| 2,725,308 | 11/1955 | Nickerson | 260/874 |
| 3,518,155 | 6/1970 | Freytag | 260/5 |
| 3,758,324 | 9/1973 | Barrett | 260/29.4 R |
| 3,775,512 | 11/1973 | Lanthier | 260/851 |

FOREIGN PATENT DOCUMENTS

| | | |
|---|---|---|
| 941,995 | 2/1974 | Canada. |
| 2,262,069 | 6/1974 | Fed. Rep. of Germany. |
| 2,300,370 | 7/1974 | Fed. Rep. of Germany. |
| 2,363,847 | 7/1975 | Fed. Rep. of Germany. |
| 956,754 | 4/1964 | United Kingdom ............ 260/29.4 YA |
| 1,146,858 | 3/1969 | United Kingdom. |

OTHER PUBLICATIONS

Powder Coating; Detroit Society on Powder Coating, Journal of Paint Technology, vol. 44, No. 565, Feb. 1972, pp. 30–37.
Bayer; Ger 920,146 cited in Chemical Abstracts, vol. 52, p.11,469def (1958).
Badische of Int; Neth Applc 6,512,569 cited in Chemical Abstracts, vol. 65, pp. 9134h,9135abc (1966).

*Primary Examiner*—Paul Lieberman
*Attorney, Agent, or Firm*—James T. Dunn; John L. Sullivan

[57] ABSTRACT

A polymeric finely-divided powder coating composition comprising a homogeneous blend of certain quantities of a solid polymeric material having a comparatively low molecular weight and containing certain reactive groups blended with certain quantities of tetrakismethoxymethylglycoluril.

10 Claims, No Drawings

CROSS LINKABLE POWDER COATING COMPOSITIONS

CROSS-REFERENCE TO RELATED APPLICATIONS

Reference is made to my pending application, Ser. No. 654,446, filed Feb. 2, 1976, (Attorney's Docket No. 25,890) and my copending application, Ser. No. 665,488, filed Mar. 10, 1976, (Attorney's Docket No. 26,154) now U.S. Pat. No. 4,064,191. Each of these pending patent applications are technically related to the subject matter of the instant application and are incorporated herein by reference.

BACKGROUND OF THE INVENTION

The original development of powder coatings started around 1950 when fluidized bed coatings were developed in Germany. Since the early 60's, powder coating has been a subject of considerable interest and commercial viability. These all solids systems eliminate the cost of shipping, storage, handling, and the energy required for evaporation of solvents in conventional coatings. Air pollution and fire hazards are minimized. In powder coatings, the products used are essentially similar to conventional liquid coatings except that no solvent is used. Instead, the coating composition is ground to a fine powder and used in that manner. The film is formed by fusing the powder particles at temperatures above the melting point of the powder coating composition, often referred to as the paint binder. The paint binder can be a thermoplastic or a thermosetting material.

FIELD OF THE INVENTION

The present invention is in the field of a polymeric finely-divided coating composition comprising a homogeneous blend of from about 70% to about 95%, by weight, of the component (A) a solid polymeric material having a molecular weight of from about 1,000 to about 100,000 and containing from about 1% to about 20%, by weight, of a carboxylic group and/or an alcoholic hydroxy group and/or an amide group, wherein said percentages, by weight, are based on the total weight of said polymeric material and, correspondingly, from about 30% to about 5%, by weight, of (B) tetrakismethoxymethylglycoluril, wherein said total homogeneous coating composition has a softening point above about 55° C. and wherein the total weight of the component (A) and the component (B) is 100%. It is preferred to use the component (A) in an amount varying between about 80% and 90%, by weight, and, correspondingly, the component (B) will vary between about 20% and 10%, by weight, same basis.

DESCRIPTION OF THE PRIOR ART

The most pertinent art known to instant Applicant is the British Pat. No. 1,146,858 and its French counterpart No. 1,486,213. No U.S. counterpart patent is presently known by the instant Applicant to exist.

SUMMARY OF THE INVENTION

This invention relates to a polymeric finely-divided coating composition comprising a homogeneous blend of two components, namely, component (A) and component (B). An optional component, namely, component (C) is an acid catalyst which can be left out altogether or can be used in an amount of about 2.0%, by weight, based on the total weight of the components (A) and (B). It is preferred to use between about 0.01 and 0.5%, by weight, same basis. Each of these components will be discussed in greater detail hereinbelow.

The component (A) is used in an amount varying between about 70% and 95%, by weight, based on the total weight of the component (A) and the component (B). The component (B) will be used in a corresponding amount varying between about 30% and about 5%, by weight, wherein these percentages, by weight, are based on the total weight of the two components and add up to 100%. It is preferred to use the component (A) in an amount varying between about 80% and 90% and, correspondingly, the component (B) will be used in an amount varying between about 20% and 10%, by weight, same basis. The component (A) is a solid polymeric material having a molecular weight of from about 1,000 to about 100,000. The molecular weight determinations are made by use of gel phase chromatography. These solid polymeric materials will contain certain reactive groups such as a carboxyl group and/or an alcohol hydroxy group and/or an amide group. These reactive groups will react with the tetrakismethoxymethylglycoluril when heated to produce a crosslinked thermoset film. The amount of these reactive groups will vary between about 1% to about 20%, by weight, based on the total weight of said polymeric material. Illustrative of these functional low molecular weight solid polymeric materials are the epoxy resins, the polyester resins, the phenolic resins, or the acrylic polymeric materials all of which are commercially available from a plurality of different sources. Some of these polymeric materials may be any one of a plurality of vinyl polymers which may be prepared by polymerizing polymerizable monomers containing reactive carboxyl groups such as acrylic acid, methacrylic acid, crotonic acid, cinnamic acid, β-benzoyl acrylic acid and polycarboxylic acids of the α,β-ethylenically unsaturated class such as maleic, fumaric, itaconic, mesaconic, aconitic and the halogenated acids such as the halogenated maleic, or more specifically, chloromaleic acid and the like. These carboxylic groups containing monomers can be used either singly or in combination with one another in the required amount and may be used with other polymerizable monomers that contain reactive alcoholic hydroxy groups or the reactive amide groups or may be used with other monomers which contain no reactive groups other than the reactive ethylenic double bond including no carboxylic groups such as methyl acrylate, ethyl acrylate, propyl acrylate, butyl acrylate, octyl acrylate, decyl acrylate, lauryl acrylate, methyl methacrylate, ethyl methacrylate, butyl methacrylate, heptyl methacrylate, decyl methacrylate, propyl crotonate, butyl crotonate, nonyl crotonate and the like. These polymerizable monomers devoid of any reactive groups may be used singly or in combination with one another in copolymerizing with a monomer containing a reactive group of the class described. Still further, one could use such other polymerizable compounds containing no reactive groups such as styrene, o-, m-, or p-alkyl styrenes such as o-, m-, or p-methyl, ethyl, propyl and butyl styrenes, 2,4-dimethyl styrene, 2,3-dimethyl styrene, 2,5-dimethyl styrene, vinyl naphthalene, methyl vinyl ether, n-butyl vinyl ether, phenyl vinyl ether, acrylonitrile methacrylonitrile, halo ring or side chain styrenes such as α-chloro styrene, o-, m-, or p- chloro styrene, 2,4-dichlorostyrene, 2,3-dichlorostyrene, 2,5-dichlorostyrene or the alkyl side chain styrenes such as the α-methylstyrene, α-ethylstyrene and the like.

If one wishes to prepare a polymeric material as component (A), utilizing a polymerizable monomer containing a reactive alcoholic group, one may use such polymerizable vinyl monomers as the hydroxy alkyl esters of the α, β, unsaturated monocarboxylic acids such as the hydroxy alkyl esters of acrylic acid, methacrylic acid, ethacrylic and the chloro as well as the other chloro substituted acrylic acids. These esters may either have a primary or a secondary hydroxyl group. Illustrative of the types of compounds that can be used to make the polymers containing the reactive alcoholic hydroxy groups are 2-hydroxyethyl acrylate, 2-hydroxypropyl acrylate, 3-hydroxypropyl acrylate, 2-hydroxybutyl acrylate, 3-hydroxybutyl acrylate, 4-hydroxybutyl acrylate, 8-hydroxyoctyl acrylate, 2-hydroxyethyl methacrylate, 5-hydroxyhexyl methacrylate, 6-hydroxyoctyl methacrylate, 8-hydroxyoctyl methacrylate, 10-hydroxydecyl methacrylate, 3-hydroxypropyl crotonate, 4-hydroxyamyl crotonate, 5-hydroxyamyl crotonate, 6-hydroxyhexyl crotonate, 7-hydroxyheptyl crotonate, 10-hydroxydecyl crotonate, and the like. These hydroxy esters may be used either singly or in combination with one another or with the polymerizable vinyl monomers devoid of any reactive group including those set forth hereinabove in the discussion of the carboxyl group-containing monomers. Obviously, these hydroxy ester monomers may be used in combination with the reactive carboxyl group-containing monomers set forth hereinabove.

Among the amide group-containing monomers which may be used to prepare the polymeric material identified as component (A) are acrylamide, methacrylamide, ethacrylamide and the like. These polymerizable acrylamides may be used to prepare the polymeric materials used in the present invention with any of the carboxyl group-containing monomers and/or the hydroxyl group-containing monomers or with any of the polymerizable monomers set forth hereinabove that are devoid of any reactive groups. These polymeric materials whether they contain the reactive carboxyl groups and/or the reactive alcoholic hydroxy groups and/or the reactive amide groups will be solid polymeric materials.

Additionally, one can make use of polyester resin compositions or alkyd resins, whether oil free or glyceride oil-containing. A substantial plurality of these materials are commercially available and are also well known in the art and, as a consequence, it is not deemed necessary to make any prolonged recitation of these materials since they are fundamentally prepared by reacting a polyhydric alcohol such as ethylene glycol or glycerol with a polycarboxylic acid or with the anhydrides thereof such as phthalic anhydride, maleic anhydride, and the like.

The following examples are illustrative of the various kinds of solid polymeric materials which may be used as the component (A) in the compositions of the present invention.

POLYESTER RESIN A

This is a commercially available polyester resin which is prepared by esterifying 114.4 parts (1.1 moles) of neopentyl glycol with 166 parts (1 mole) of terephthalic acid using 1.45 parts of dibutyl tin oxide as the catalyst. The water, formed during the reaction, is removed at about 200°-220° C. The reaction is carried out until the acid number drops below 10. The softening point of the polyester resin is about 105° C.

POLYESTER RESIN B

This is also a commercially available polyester resin prepared by reacting 271 parts (1.63 moles) of isophthalic acid, 57 parts (0.36 mole) of pelargonic fatty acids, 360 parts (4.7 moles) of propylene glycol and 418 parts (2.8 moles) of trimellitic anhydride. The reaction is carried out at a temperature between about 200°-220° C. The final acid number of the polyester resin is 115-120 and has a softening point of about 95° C.

ACRYLIC RESIN C

Into a suitable reaction vessel equipped with a stirrer, thermometer, reflux condenser, dropping funnel and inert gas inlet and outlet tubes, there is introduced 56.5 parts of water containing 0.01 part of a fatty alcohol sulfate dispersing agent, 0.75 part of a 5% aqueous solution of polyvinyl alcohol and 0.6 part of sodium sulfate. The charge is heated to about 100° C. and there is introduced in comparatively small increments a blend of 8.4 parts of styrene, 2 parts of methyl methacrylate, 8.8 parts of 2-ethylhexyl acrylate, 12.0 parts of n-butyl acrylate, 8.8 parts of hydroxypropyl methacrylate, 0.8 part of acrylic acid and 0.65 part of t-butyl peroctoate as the polymerization initiator. The polymerization is carried out by heating at about 100° C. until there is produced a hydroxy functional acrylic bead solid polymer having an acid number of about 16 and a hydroxyl number of about 82.

The second component used in the polymeric finely-divided powder coating composition of the present invention is component (B), namely, tetrakismethoxymethylglycoluril. The following examples illustrate the preparation of the component (B).

PREPARATION OF GLYCOLURIL

Into a suitable reaction vessel equipped with stirrer, thermometer, and reflux condenser, there was introduced 765 parts of urea and 875 parts of water. To this slurry, 282 parts of concentrated sulfuric acid were charged and the mixture was heated to 70° C. At 70° C., 605 parts of glyoxal (40% aqueous solution and free from formaldehyde) were added slowly to the clear solution such that the reaction temperature is maintained between 75°-80° C. After the addition of glyoxal, the reaction mixture was held at 75° C. for one hour and then cooled. The separated crystalline glycoluril was filtered and washed with water and a dilute caustic aqueous solution. The glycoluril obtained after drying has a m.p. of 298°-300° C. and the yield was 88% (525 parts).

PREPARATION OF TETRAMETHYLOL GLYCOLURIL

Into a suitable reaction vessel equipped with a stirrer, thermometer, and reflux condenser, there was introduced 688 parts (10 moles) of aqueous formaldehyde (44%), and the pH was adjusted to 8.7 with 22 parts of 0.5 N NaOH solution. To this solution, 284 parts (2 moles) of glycoluril were added at 40° C. During the reaction, the temperature was allowed to rise up to 55° C. At this stage, most of the glycoluril went into solution. After about 15 minutes, the pH was adjusted to 8.0 with five parts of 0.5 N NaOH. A clear pale yellow colored solution was obtained. The clear solution was distilled at 50° C. under reduced pressure to remove water, until the reaction vessel content was about 640 parts. The syrup in the vessel was poured into 800 parts of methanol. The white crystalline precipitate was filtered and dried. The total yield of the tetramethylol glycoluril was 483 parts (92% yield) and m.p. 132°–136° C.

PREPARATION OF TETRAKISMETHOXYMETHYLGLYCOLURIL

Into a suitable reaction vessel equipped with stirrer, thermometer, and condenser were charged 640 parts (20 moles) of methanol and 20 parts of 70% con. nitric acid. To this acidic methanol, 262 parts (1 mole) of tetramethylol glycoluril were charged, and the reaction mixture was heated to 40° C. with stirring. In about 20 minutes, all of the tetramethylol glycoluril went into solution. When the reaction mixture became clear, it was cooled to 22° C. and 45 parts of 20% sodium hydroxide solution were added to neutralize the reaction mixture to a pH of 7-8. The neutralized clear solution was heated to 50°–55° C. and 450 parts of methanol were removed under slightly reduced pressure. The residue in the flask crystallized on standing for a few hours. The crystalline solids were filtered and washed with a small amount of water. The filtrate was then vacuum stripped at 70°–80° C. to remove all the water. The solid residue was then dissolved in benzene and the undissolved salt was removed by filtration. The benzene solution was mixed with the first crop of solid crystals and dissolved with additional benzene and was filtered again. On removal of benzene, 310 parts of tetramethoxymethyl glycoluril (TMMGU) was obtained. The yield was 97%. It was recrystallized from benzene. The recrystallized product had the melting point of 116°–118° C. The structure of TMMGU was confirmed by I.R., N.M.R and nitrogen analysis.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

EXAMPLE 1

A powder coating composition was prepared by introducing into a suitable reaction vessel 240 parts of the polyester resin A and it was melted and heated to 160° C. To molten polyester resin, there was added 150 parts of titanium dioxide pigment and the two components were dispersed with a high speed disperser. To the dispersed pigment paste there was added 60 parts of tetrakismethoxymethylglycoluril at 150° C. and the components were blended for about five minutes. To this paste there was added 0.5 part of para-toluene sulfonic acid and the components were stirred for 30 minutes and poured onto an aluminum tray. The blend was permitted to cool to a solid cake and after cooling, it was ground and then pulverized with a micromill and ball mill. The fine powder was sieved through a 140 mesh screen. About 250 parts of a finely-ground powder of less than 120μ size was obtained. It was electrostatically sprayed with 60 kv charge, on Bonderite 1000 steel panels. The powder coated panels were cured at 175° C. and 200° C. for 20 minutes. The cured panels were smooth and tough. The film thickness was between about 1.1–1.5 mils and had a pencil hardness of H-3H and reverse impact resistance of 40 in./lbs. The cured film had good solvent resistance.

EXAMPLE 2

An unpigmented powdered coating composition was prepared in the manner used in Example 1 except that there was used 90 parts of the polyester resin A and only 10 parts of the tetrakismethoxymethylglycoluril. The unpigmented powder had a particle size of between about 70–100μ. The unpigmented powder had a softening point between about 62° and 70° C. A similar powder was prepared by blending 90 parts of the polyester resin A with only 10 parts of hexakismethoxymethylmelamine which powder had the same particle size as the unpigmented powder and had a softening powder of about 55°–65° C.

EXAMPLE 3

Example 1 was repeated in all essential details by first introducing 80 parts of polyester resin B into a suitable mixing vessel and the polyester resin was melted and then there was added 20 parts of the tetrakismethoxymethylglycoluril. After they had been thoroughly blended together, the mixture was cooled and ground to a fine powder having a particle size below 75μ. The unpigmented powder thus prepared was electrostatically sprayed onto iron phosphate pretreated cold rolled steel panels and then cured at 200° C. for 30 minutes. The powder particles were fused into a uniform film and the clear films were cured and resistant to organic solvents.

EXAMPLE 4

Into a suitable mixing vessel as in Example 1 there is introduced 80 parts of the Acrylic resin C and 20 parts of tetrakismethoxymethylglycoluril and 0.4 part of p-toluene sulfonic acid. The ingredients were blended together to give a fine homogeneous powder which was sprayed electrostatically on iron phosphate pretreated cold rolled steel panels and then cured at 175° C. for 20 minutes. The powder particles were fused into a uniform film and the clear film was hard and resistant to organic solvents.

EXAMPLE 5

Example 4 was repeated in all essential details except that instead of the Acrylic resin C there is substituted a commercially available non-heat reactive alkylphenol-formaldehyde resin marketed by Union Carbide under the tradename BAKELITE CK-0036, having a softening point of about 95°–100° C. Powder coated panels from this composition were cured at 175° C. for about 20 minutes to produce smooth films with good chemical resistance.

EXAMPLE 6

Example 4 was repeated in all essential details except that instead of the Acrylic resin C there was used an equivalent amount of a commercially available epoxy resin marketed by the Dow Chemical Company under the tradename D.E.R. 663 U having a softening point of about 88°–98° C. The composition was used to powder coat some steel panels which were then cured at about 175° C. for 20 minutes. The film thus obtained was smooth and had good chemical resistance.

Similarly, hydroxy functional acrylic resins such as those described in the U.S. Pat. No. 3,846,368 and the commercially available epoxy resins prepared by reacting bis-phenol A with epichlorohydrin such a Epon 1007 or phenol-formaldehyde resins can be used in combination with tetrakismethoxymethylglycoluril as the crosslinking agent.

Powders for fluidized bed coatings are relatively coarse in particle size, ranging from about 100 to 300μ. The fluidized bed coatings are thicker (>5 mils) than 1-3 mils required in the paint industry. The application of films of less than 2 mils is feasible only by the powder applied by spray technique. The particle size of the powders is also much smaller in the range of 10-75μ. A powder must be stable in the package at about 49° C., be free-flowing in the gun feed and should be capable of forming uniform films below 200° C. In order to have a stable powder in the package, the softening point should be above 55° C. In case of thermosetting powder compositions, the powder should fuse and form uniform films during the baking before it becomes crosslinked. Thus, for most practical purposes, the powder should melt between about 55° C. and 150° C. For those polymers containing carboxylic acid groups, it may be required to use temperatures of 200° C. in order to achieve crosslinking. A softening point of the powder greater than 150° C. can be tolerated. In strongly acid catalyzed systems, containing hydroxy or amide groups, in the polymers, a softening point lower than 150° C. will be desirable because the crosslinking reaction is initiated as low as 125° C. In such cases the powder should have a softening point below 110° C. For optimum flow characteristics there are a number of low molecular weight polymeric additives that can be added and they will plasticize the films therby lowering the softening point of the powder.

It has been indicated hereinabove that the acid catalyst is only used optionally and it has been identified as the component (C). The amount of the acid catalyst, therefore, can be present in amounts varying from 0.0% to 2.0% and preferably, 0.01% to about 0.5%, by weight, based on the total weight of the (A) component and the (B) component, solids. Among the preferred acid catalysts that may be used in the compositions of the present invention are trismethyl sulfonylmethane, trishexyl sulfonylmethane, p-toluene sulfonic acid, n-dodecyl benzene sulfonic acid, naphthalene sulfonic acid, dinonyl naphthalene sulfonic acid, and the like. Reference is made to the copending application of Leonard Josef Calbo, Jr., Ser. No. 512,282, filed Oct. 4, 1974, now U.S. Pat. No. 3,960,688, which is incorporated herein by reference. The catalytic activity of an acid can also be generated in the coating compositions of the present invention by incorporating sulfonic acid groups into the polymeric material (A). This can be achieved by copolymerizing from about 0.01% to about 2.0% (based on the total monomer weight) of a monomer such as 2-sulfoethyl methacrylate, styrene sulfonic acid and the like. It is also possible to use alkyl esters of phosphoric acid or alkylphosphonic acids as the acid catalyst in the coating compositions of the present invention.

Weaker organic acids such as formic acid, acetic acid, phthalic acid and the like may be used but are not preferred because they are not effective in promoting the crosslinking reaction at temperatures below 175° C. in a reasonable period of time such as less than about 30 minutes.

Inorganic acids such as nitric, sulphuric, phosphoric, hydrohalic, Lewis acids, and the like may also be used.

It has been indicated hereinabove that an acid catalyst may be used with the compositions of the present invention. In the presence of an acid catalyst, the reactive groups, whether they be carboxylic groups, alcoholic hydroxy groups, or amide groups, will react with the tetrakismethoxymethyl glycoluril when heated in order to produce a crosslinked theremoset film. However, when the polymeric material contains at least about 2% carboxylic acid groups, the presence of an additional acid catalyst is not essential in order to produce a crosslinked thermoset film. On the other hand, when the polymer contains no carboxylic acid groups but does contain only alcoholic hydroxy groups and/or amide groups, the presence of an acid catalyst, such as p-toluene sulfonic acid is necessary in order to produce a crosslinked thermoset film upon heating.

The thermosetting polymeric finely-divided powder coating composition of the present invention contains the component (A) which is a low molecular weight functional polymer having a melting point range from about 50° C. to about 150° C. and the component (B) which is tetrakismethoxymethylglycoluril having a melting point above ambient temperature. The selection of resins for powder coatings requires significant criticality. The friability, crystallinity, melting point, glass transition temperature, and thermostability are some of the properties that have to be taken into consideration. High solvating plasticizers must be avoided in order to minimize caking. The use of the hexakismethoxymethyl melamine as a crosslinking agent for powders has been practiced in the past but because of its low melting point (30° C. to 50° C.) and its waxy nature, the incorporation of more than 10% of hexakismethoxymethyl melamine based on the total weight of the binder results in a lowering of the glass transition temperature of the powder and the caking tendency of the powder increases greatly. Epoxy resins have also been used as the crosslinking agent but films obtained from such compositions have displayed comparatively poor outdoor durability. As a consequence, the use of the tetrakismethoxymethylglycoluril, as the cross-linking agent, in these powder coating compositions provides good stability of the powders, provides more cake resistant powders and the films produced therefrom have good chemical resistance properties and increased adhesion.

The component (A) as a solid polymeric material should have a softening point between about 55° C. and 150° C. and since the crosslinking agent has a softening point of about 118° C., a blend of the two materials, as a mixture which may in some instances be an eutectic mixture, will generally have a softening point between about 55° C. and 120° C.

The component (B), namely, the tetrakismethoxymethylglycoluril is not a pure compound inasmuch as in the commercial preparation of the tetrakismethoxymethylglycoluril, it is virtually impossible to prevent the formation of quantities of the dimer, the trimer, the tetramer and higher oligomers. The component (B) is, therefore, a heterogeneous mixture of these various members of the same family. When the expression "tetrakismethoxymethylglycoluril" is utilized herein, these additional materials are encompassed within the total composition. When the quantities are recited, namely, from 30% to about 5% of the component (B), it is intended to encompass the total composition including the dimers, etc. These components higher than the monomer may be present in relatively small amounts, but they also may be present in rather significant amounts such as about 30%, 40%, or higher of the total weight of the composition.

Sometimes clear films are desired in which event no pigmentation is used in the total composition although color can be imparted to the clear films by the use of selected dyes, etc. When colored opaque films are desired, any of the conventionally commercially available pigments may be used in the selected amounts so as to give the right color and shade to the coating compositions.

Modifiers to control the flow of the film during the baking cycle may be used in order to improve the film appearance. The amount of such a modifier may be less than 5% by weight based on the total solids weight. Modifiers such as Monsanto's Modaflow, or cellulose acetate butyrate and silica can be used to control the flow of the composition.

In addition to the electrostatic spraying techniques one may make use of the fluidized bed and the electrostatic fluidized bed in applying the compositions of the present invention.

Although the coatings of the present invention will be principally used to coat metals such as steel, aluminum, and the like, the coatings of the present invention can also be used on other substrates such as wood, glass, plastics and the like.

I claim:

1. A polymeric finely-divided powder coating composition comprising a homogeneous blend of from about 70% to about 95%, by weight, of (A) a solid polymeric material having a molecular weight of from about 1,000 to about 100,000 and containing from about 1% to about 20%, by weight, of a carboxyl group and/or an alcoholic hydroxy group and/or an amide group, based on the total weight of said polymeric material and, correspondingly, from about 30% to about 5%, by weight of (B) tetrakismethoxymethylglycoluril, wherein said coating composition has a softening point above about 55° C., wherein the total combined weight of (A) and (B) is 100%.

2. The powder coating composition according to claim 1 in which the component (A) is present in an amount from about 80% to 90%, by weight, and the component (B) is present correspondingly in an amount of from about 20% to 10%, by weight.

3. The powder coating composition according to claim 1 in which the solid polymeric material is an epoxy resin.

4. The powder coating composition according to claim 1 in which the solid polymeric material is a polyester resin.

5. The powder coating composition according to claim 1 in which the solid polymeric material is a phenolic resin.

6. The powder coating composition according to claim 1 in which the solid polymeric material is an acrylic polymeric material.

7. The powder coating composition according to claim 1 containing a pigment.

8. The powder coating composition according to claim 1 which is an unpigmented coating.

9. The powder coating composition according to claim 1 in which an acid catalyst is incorporated into the compositions.

10. The powder coating composition according to claim 9 in which the acid catalyst is p-toluene sulfonic acid.

* * * * *